UNITED STATES PATENT OFFICE.

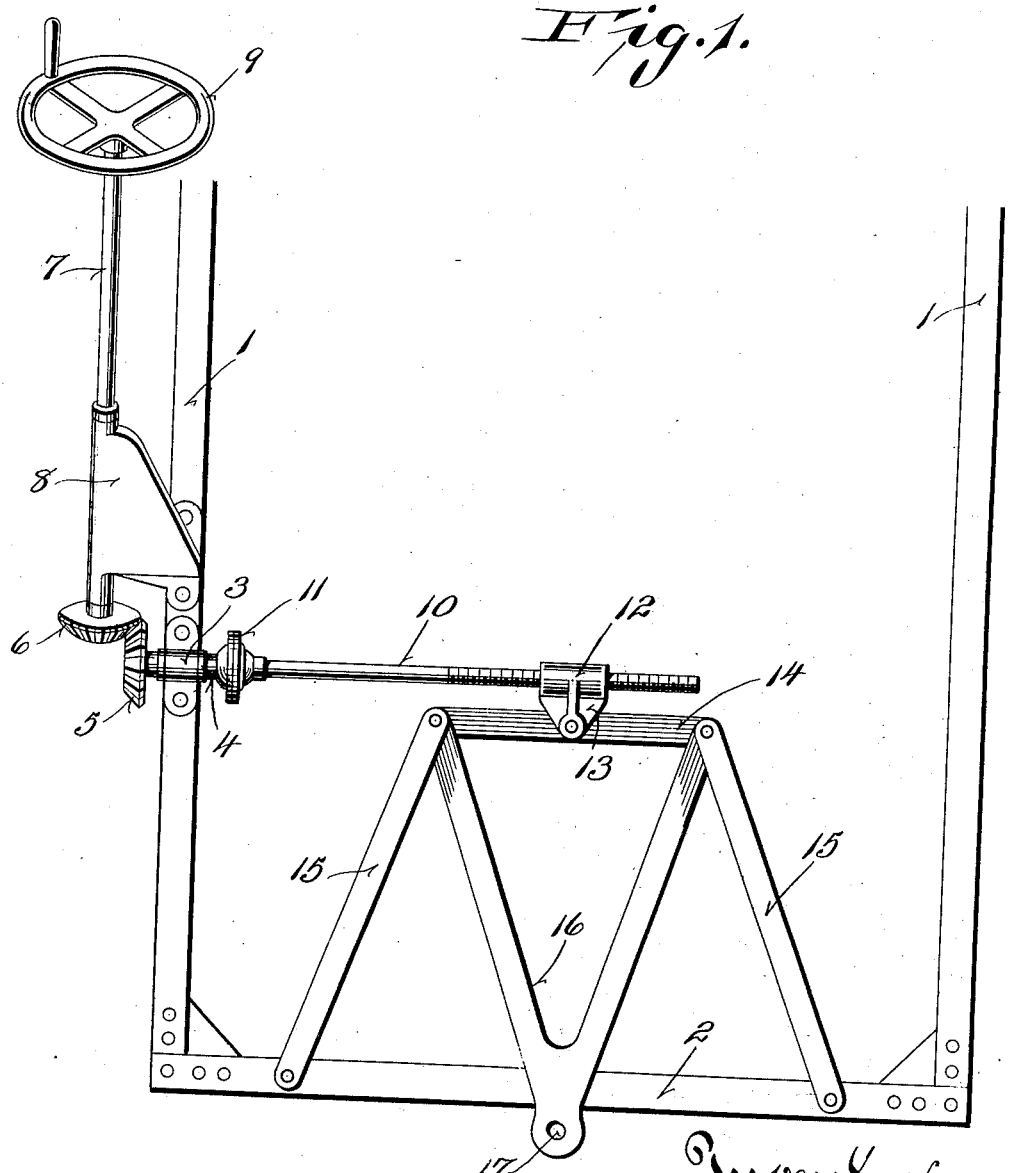

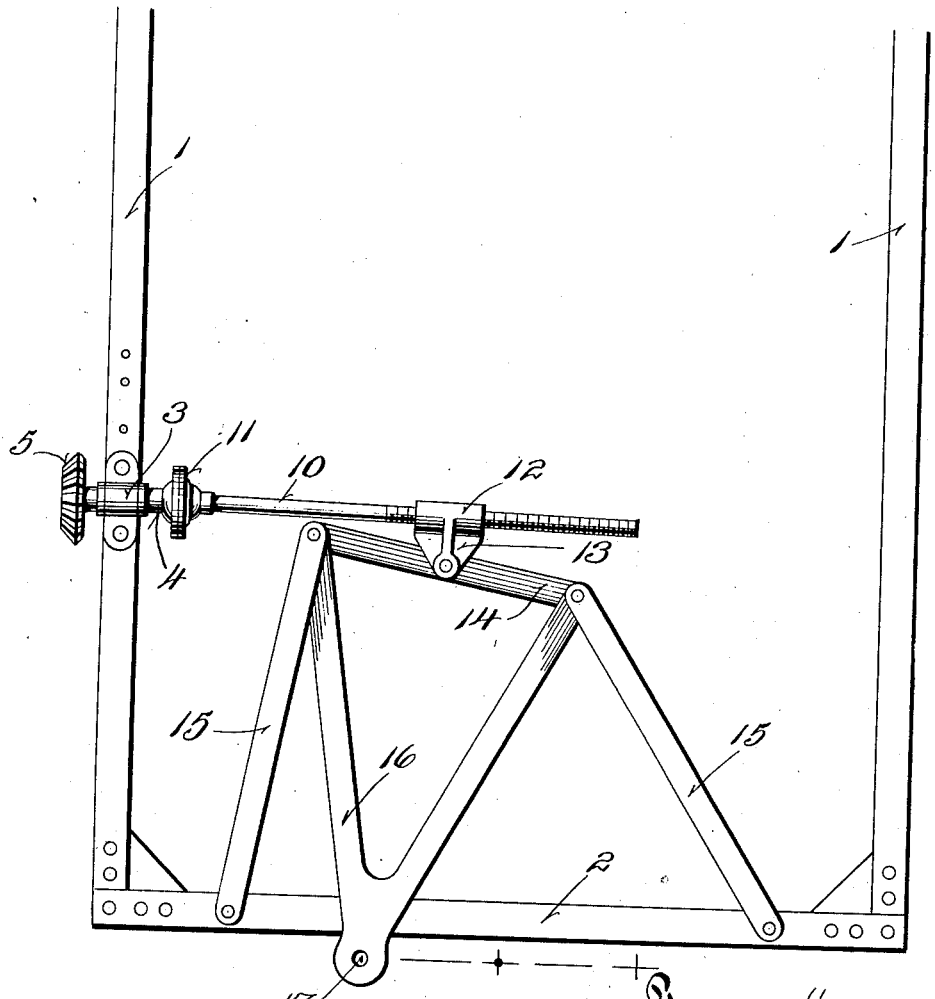

FRANK R. BROOKMAN, OF TOMAH, WISCONSIN.

TRACTOR-HITCH.

1,368,603.  Specification of Letters Patent.  Patented Feb. 15, 1921.

Application filed March 15, 1920. Serial No. 365,864.

*To all whom it may concern:*

Be it known that I, FRANK R. BROOKMAN, a citizen of the United States, and resident of Tomah, in the county of Monroe and State of Wisconsin, have invented certain new and useful Improvements in Tractor-Hitches; and I do hereby declare that the following is a full, clear, and exact description thereof.

My invention pertains to new and useful improvements in attaching means for tractors and other draft machines for connecting articles thereto which are to be drawn thereby.

The primary object of the invention is to provide a draft appliance of this character which is especially adapted for use in connection with tractors and is so constructed that the articles being drawn by the tractor may be shifted from side to side to vary their offset with respect to the point of attachment to the tractor. By the use of such a draft appliance or tractor hitch much more efficient work can be done by the article which is being drawn, for instance a plow.

An additional object of the invention is to provide a new and improved means which can be so associated with an actuating means that the hitch portion forming a part thereof may be readily shifted in a straight line at right angles to the plane of direction of movement of the draft machine.

A further object of the invention is to provide a tractor hitch which can be readily adjusted by the driver of the tractor and from his seat thereon.

With these general objects in view the invention resides in the novel features of construction, combination and arrangement of the parts which will be hereinafter more particularly described and claimed.

In the accompanying drawing:

Figure 1 represents a plane view of my improved hitch and the means for securing it to a draft machine, the parts being arranged in normal position.

Fig. 2 is a similar view, certain parts of the hitch shifting means being removed, and the hitch itself arranged in a different position from that shown in Fig. 1.

In the depicted embodiment of the invention, the reference characters 1 denote the side bars of an attaching frame, which also includes a rear or end bar 2, said side bars 1 being adapted to be secured in any preferred manner to a tractor or other draft machine. Journaled in a bearing 3 carried by one of the side bars 1 is a short shaft 4, the outer end of which is provided with a bevel gear 5. As will be seen from Fig. 1 this gear 5 is meshed with a similar gear 6 on the lower end of an adjusting post or shaft 7, this shaft being journaled in an elongated bearing carried by a bracket 8 also secured to the same side bar 1 as that on which the bearing 3 is mounted. A hand wheel 9 on the upper end of the shaft 7 is located adjacent the driver's seat of the tractor or the like so that the operator thereof may readily rotate the hand wheel to revolve the short shaft 4 in any desired direction.

The inner end of the short shaft 4 is connected to a screw shaft 10 by means of a universal joint 11. The threaded portion of the shaft 10 receives an internally threaded pivot carrying collar 12, the same having a pivot ear 13 to which a pivot bar 14 is fulcrumed midway its ends.

The opposite ends of the pivot bar 14 have one end of the brace links 15 pivoted thereto, the opposite ends of said links being pivoted to the end bar 2 of said attaching frame. The end bar pivots of the links 15 are spaced equal distances from the longitudinal center line of said attaching frame and consequently similar distances from the ends of the side bars 1. The hitch portion of my invention is carried by the pivot bar 14 and supported by the brace links 15, and comprises a substantially V-shaped member 16, the apex of which is formed into an eye 17, whereas the spaced ends of the arms forming said V are connected to the opposite ends of the pivot bar 14 by means of the pivots which secure the links 15 to the latter. By means of the eye 17 any suitable form of device or machine may be connected with the tractor to be drawn thereby.

Under normal conditions the article to be drawn is adapted to follow directly behind the tractor or other draft machine in which case the pivot of the bar 14 and the eye 17 are disposed in the longitudinal center line of the frame formed of the bars 1 and 2.

On the other hand there are times when it is most advantageous to have this eye 17 located either to one side or the other of said center line, for instance when the tractor is used for pulling a plow in a curve or when furrows are being turned on the side of a hill. Therefore the screw shaft is rotated to shift the sleeve 13 and the pivot carried thereby which will simultaneously rock the pivot bar 14 and the V-shaped member 16 to shift the eye 17 as shown in Fig. 2. Owing to the pivotal connection between the brace links 15 and said pivot bar 14 together with the movement of the pivot of the latter, said bar may be rocked comparatively slightly to shift the eye 17 considerably. However, the eye is moved in the same plane from one position to another, which plane extends transversely of the line of direction of movement of the tractor or the like and substantially parallel with the end bar 2. With the parts arranged as shown in Fig. 2, the hitch member is effectively braced and held against shifting until the sleeve 12 is moved by the brace links 15. Consequently with only a slight rotation of the hand wheel 9, the hitch eye 17 can be quickly and easily shifted to any desired position by the operator of the tractor or the like while he remains in his seat.

Various changes may be made in the form and proportions and in the general association of the several parts of the invention without departing from the principles thereof or sacrificing any of the obvious advantages.

I claim:

1. In a device of the character described, a frame, links of equal length pivoted to the rear part of said frame and extending forwardly, a lever having its ends pivotally connected to the ends of said links, a draft member having legs of equal length diverging forwardly and having their ends pivotally connected to the ends of said links, a fulcrum member on which said lever is centrally fulcrumed, and means for shifting said fulcrum member transversely of the frame.

2. In a device of the character described, a frame, links of equal length pivoted to the rear part of said frame and extending forwardly, a lever having its ends pivotally connected to the ends of said links, a draft member having legs of equal length diverging forwardly and having their ends pivotally connected to the ends of said links, a fulcrum member on which said lever is centrally fulcrumed, and a rotatable screw threaded shaft extending transversely of said frame, said fulcrum member being threaded onto said shaft whereby it is moved transversely when said shaft is rotated.

3. The combination with a draft machine of a frame including a bar extending substantially at right angles to the line of direction of movement of the machine, a screw shaft carried by the frame, a pivot carrying sleeve movable longitudinally of the shaft on the threaded portion thereof, a hitch member including a pivot bar fulcrumed to said sleeve midway its ends, an attaching portion disposed equidistant from the ends of the pivot bar, and links of uniform length pivotally connected to the opposite ends of the pivot bar and with said frame bar, said attaching portion being movable transversely of the line of direction of movement of the machine and substantially parallel with said frame bar when the sleeve is shifted longitudinally of the shaft.

In testimony that I claim the foregoing I have hereunto set my hand at Tomah in the county of Monroe and State of Wisconsin.

FRANK R. BROOKMAN.